No. 696,114. Patented Mar. 25, 1902.
W. J. STEVENS.
CAR BRAKE.
(Application filed May 31, 1901.)
(No Model.) 2 Sheets—Sheet 1.

WITNESSES. INVENTOR.
Amos K Butler Willie J. Stevens
Wilbur G Hapgood

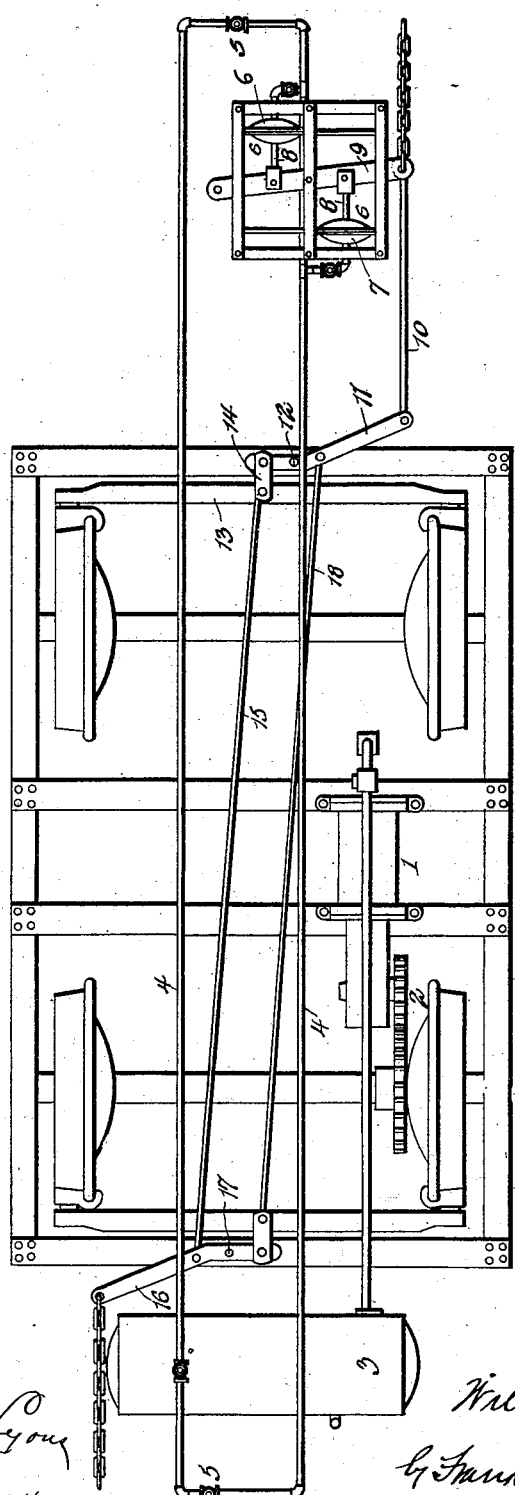

UNITED STATES PATENT OFFICE.

WILLIE J. STEVENS, OF SKOWHEGAN, MAINE, ASSIGNOR, BY DIRECT AND MESNE ASSIGNMENTS, TO THE STEVENS AIR BRAKE COMPANY, OF SKOWHEGAN, MAINE, A CORPORATION.

CAR-BRAKE.

SPECIFICATION forming part of Letters Patent No. 696,114, dated March 25, 1902.

Application filed May 31, 1901. Serial No. 62,658. (No model.)

*To all whom it may concern:*

Be it known that I, WILLIE J. STEVENS, a citizen of the United States of America, residing at Skowhegan, in the county of Somerset and State of Maine, have invented certain new and useful Improvements in Car-Brakes, of which the following is a specification, reference being had therein to the accompanying drawings.

This invention relates to brakes, and particularly to those which are automatically operated by means of air-pressure stored by running of the car.

The object of the invention is to provide a truck capable of confining air under pressure and in combination therewith an air-pump operating from the axle of the vehicle or car with means for regulating the pressure in the tank.

Furthermore, the object of the invention is to provide an equalizing-bar suitably pivoted and in combination therewith oppositely-reciprocated pistons pivoted to the bar and means for actuating the pistons.

Furthermore, the object of the invention is to produce an air-reservoir and in combination therewith an air-pump, a pipe connecting the reservoir and pump, diaphragm-chambers suitably connected to the reservoir, a motorman's valve for controlling the flow of air to the diaphragm-chambers, and the brakes.

Furthermore, the object of the invention is to produce an air-brake system which will possess advantages in points of simplicity, durability, and inexpensive construction.

In describing the invention in detail reference will be had to the accompanying drawings, forming a part of this specification, wherein like characters denote corresponding parts in the several views, and in which—

Figure 1:
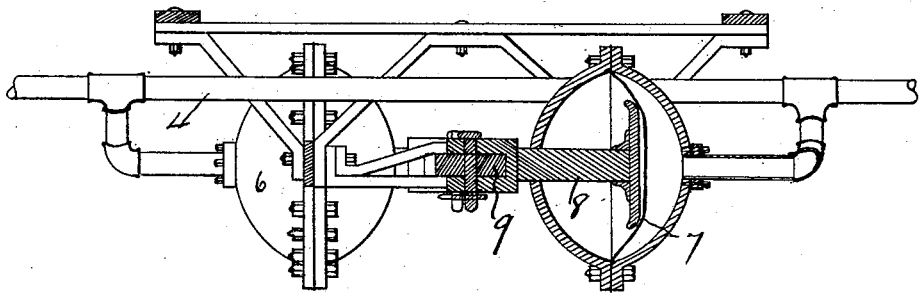
Figure 2:
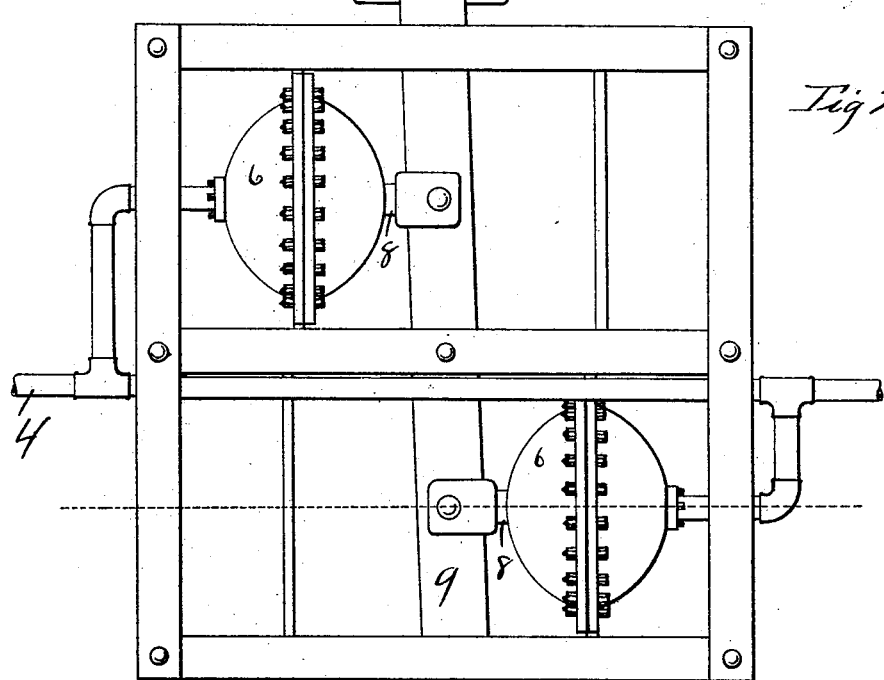

Figure 1 is a view in elevation, partly in section, of a car-truck with the invention applied. Fig. 2 is a top plan view thereof, and Fig. 3 is a view showing the parts connected by the pipes.

In these drawings, 1 indicates the air-pump, which may be of any ordinary construction, driven from the car-axle in any suitable manner, here shown by gearing 2. The storage-tank 3 receives the air from the pump, and the pipes 4 are charged from the reservoir. A motorman's valve 5 of the ordinary three-way type is interposed in the air-pipe for controlling the air which is directed to the diaphragm-chamber 6. Two of these chambers are provided for each car, and each has a diaphragm 7 and a diaphragm-rod 8, which projects from the cylinder and is attached to the equalizing-lever 9, said lever being pivoted centrally of the truck-frame. The rods 8 are projected in opposite directions by pressure within the diaphragm-chamber, and the opposite ends of said rods 8 are pivoted to the lever 9, and the lever 9 has a suitable connection 10, leading to the lever 11, and the lever 11 is pivoted at 12 to the car-frame. The lever 11 is connected to the brake-beam 13 by the metallic straps 14 and a rod 15, extending from the connections of the straps 14 and brake-beam to a lever 16, which is pivoted to the truck-frame at the opposite end. The lever 16 is swung on its pivot 17 through the action of the rods 15 and 18, which are actuated by means of the lever 11. The lever 16 is connected to one of the brake-beams and actuates the said beam simultaneously with the brake-beam on the opposite end of the frame.

By means of the three-way valve in the air-pipe the air is allowed to pass from the reservoir to the diaphragm-chambers when the car is to be stopped or when the brakes are to be applied, and by turning the valve in a direction opposite to that in which it is turned for applying the brakes the air from the reservoir is shut off and one part of the valve is in communication with the open air and the pressure in the diaphragm-chamber is removed. As one of the motorman's valves will be placed on each end of the car, it will be seen that the brakes may be controlled from the front or rear platform. It will be observed, also, that quick action and great pressure is attained through the action of the air-brake system as disclosed.

Having thus fully described the invention, what I claim as new, and desire to secure by Letters Patent, is—

In a car-brake, an air-pump operated from a car-axle, a reservoir into which the pump forces air, diaphragm-chambers and reservoir-valves in the pipes for admitting air to the diaphragm-chambers and allowing the air to escape, rods operated by the diaphragm, an equalizing-lever pivoted centrally, operated by the rods, levers pivoted to the car-frame at each end, brake-beams, links connecting each lever to its respective brake-beam and rods leading from each brake-beam to the lever at the opposite end of the car, substantially as described.

In testimony whereof I affix my signature in the presence of two witnesses.

WILLIE J. STEVENS.

Witnesses:
    AMOS K. BUTLER,
    WILBUR G. HAPGOOD.